VARIABLE RELUCTANCE TYPE PICKUP CARTRIDGE

Filed Aug. 22, 1967 3 Sheets-Sheet 1

INVENTOR
ATSUSHI IGA

BY Wenderoth, Lind & Ponack
ATTORNEYS

INVENTOR
ATSUSHI IGA

BY Wenderoth, Lind & Ponack
ATTORNEYS

Sept. 1, 1970 ATSUSHI IGA 3,526,728

VARIABLE RELUCTANCE TYPE PICKUP CARTRIDGE

Filed Aug. 22, 1967 3 Sheets-Sheet 3

INVENTOR
ATSUSHI IGA

BY Wenderoth, Lind & Ponack
ATTORNEYS 3,526,728

VARIABLE RELUCTANCE TYPE PICKUP CARTRIDGE

Atsushi Iga, Hirakata-shi, Japan, assignor to Matsushita Electric Industrial Co., Ltd., Kadoma, Osaka, Japan Filed Aug. 22, 1967, Ser. No. 662,473
Claims priority, application Japan, Oct. 20, 1966, 41/69,378
Int. Cl. H04r *11/12*
U.S. Cl. 179—100.41 7 Claims

ABSTRACT OF THE DISCLOSURE

A magnetic stereophonic phonograph pickup comprising a pair of magnetic circuit elements connected with a magnet, each of said pair of magnetic circuit elements consisting of a pair of pole pieces opposed to each other, consisting of a yoke connected to a pole of said magnet, consisting of two cores and consisting of two coils which are wound around said two cores, respectively and which are series-connected to each other so as to act as a single coil, said pair of pole pieces of one of said pair of magnetic circuit elements being on a line which is perpendicular to the line on which the pair of pole pieces of the other of said pair of magnetic elements lies, and an armature which is composed of a magnetic material and is positioned in the space having the magnetic field from the two pairs of said pole pieces so as to move freely in accordance with the movement of a stylus which is connected to said armature through a shank made of non-magnetic material.

BACKGROUND OF THE INVENTION

Field of the invention

This invention relates to a magnetic stereophonic phonograph pickup of a variable reluctance type and more particularly to a magnetic stereophonic phonograph pickup comprising a pair of magnetic circuit elements combined with a magnet, each pair of the magnetic circuit elements consists of a pair of pole pieces, a yoke and two cores provided with two coils, respectively.

Description of the prior art

At present, magnetic phonograph pickup cartridges of the variable reluctance type are readily available. For example, U.S. Pat. 2,264,897 to Kaar as well as U.S. Pat. 3,047,677 to Pritchard disclose this type of cartridge. A prior magnetic phonograph pickup cartridge comprises a stylus, two air gaps between the armature and magnetic pole pieces and a pair of magnetic cores provided with a pair of coils. A magnetic flux from one pole of a permanent magnet flows to the opposite pole of the magnet through an armature composed of a ferromagnetic material. The movement of the armature due to the vibratory motion of the stylus along the undulations of the groove of a phonograph record modulates the reluctance of the air gaps so as to induce signals in the coils. A shank connected to the armature in these conventional cartridges must be made of a ferromagnetic material such as $\mu$-metal of Permalloy because it forms a part of the flux path therein.

As a practical matter, it is desirable for reproducing the sound from stereophonically recorded disks to reduce the weight of a vibrating shank connected to a stylus. Conventional pickup cartridges of a variable reluctance type are inferior in reducing the weight of the shank which is required to be made of ferromagnetic material. In addition, a conventional pickup cartridge of the variable reluctance type usually comprises one coil for each channel for reproduction of stereophonic sound. An external leakage of magnetic flux is apt to enter directly into a core through a ferromagnetic armature and produces undesirable noises. It is necessary for suppressing such noises to provide a channel with a pair of coils which are connected oppositely in series to each other for compensating for the external magnetic flux.

SUMMARY OF THE INVENTION

An object of this invention is to provide an improved variable reluctance type magnetic phonograph pickup capable of satisfactorily reproducing the sound from stereophonically recorded disks.

Another object of the invention is to provide an improved variable reluctance type, magnetic phonograph pickup capable of employing a light, non-magnetic material as a shank.

BRIEF DESCRIPTION OF THE DRAWINGS

The invention will now be described in connection with the accompanying drawings in which.

DETAILED DESCRIPTION OF THE INVENTION

Figure 1:
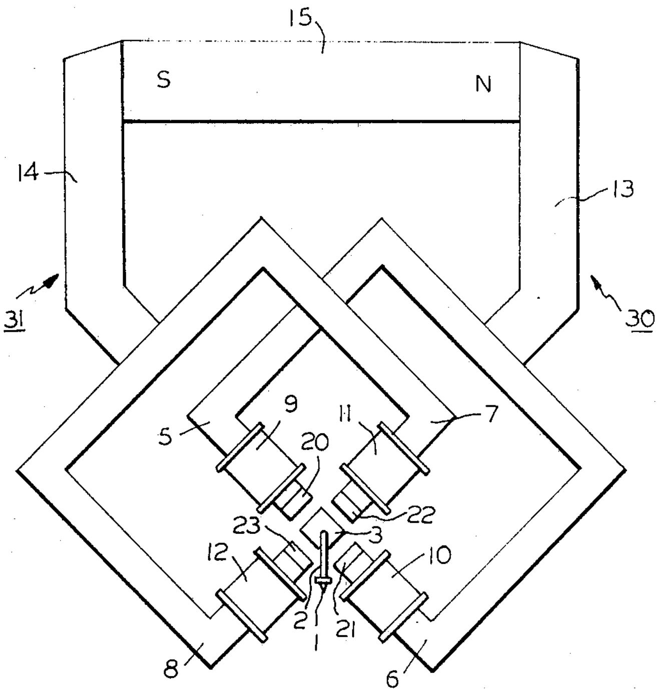
FIG. 1 is a schematic diagram illustrating the fundamental construction and operating principle of the variable reluctance type pickup of the present invention.

Before proceeding with a detailed description of the invention, the novel scope of this invention will be explained with reference to FIG. 1, in which reference character 15 designates a magnet and 13 and 14 are yokes attached to the opposite ends of said magnet 15. Said yoke 13 is combined with two pole pieces 20 and 21 through two cores 5 and 6 and said yoke 14 is combined with two pole pieces 22 and 23 through two cores 7 and 8. The combination of the yoke, two cores and two pole pieces will be referred to as a magnetic circuit element hereinafter for convenience. Said pole pieces 20, 21, 22 and 23 form a space for an armature 3. Said core 5 induces currents in coil 9 and at the same time are series-connected thus operating as a single coil. Said cores 7 and 8 are similarly provided with coils 11 and 12 which are series-connected to each other thus operating as a single coil. A stylus 1 is connected to said armature 3 through a shank 2. Said armature is positioned in the space to move freely as said stylus 1 moves along channels of the groove of a disk. When the armature 3 moves toward, for example, the pole piece 20 according to the movement of stylus 1 along one channel, the magnetic flux in the core 5 increases whereas the magnetic flux in core 6 decreases. The total magnetic flux of both cores 5 and 6 is almost the same as that obtained when the armature 3 is positioned at a neutral position in which core 5 has essentially the same magnetic flux as that of core 6. The increase in the magnetic flux in core 5 induces current in coil 9 and at the same time the decrease in the magnetic flux of core 6 induces currents in coil 10. Coils 9 and 10 are connected in such a way that the induced currents in both coils are integrated. On the other hand, there is no variation in the magnetic flux of cores 7 and 8 because the armature 3 does not move in the direction of poles 22 and 23. The movement of the stylus along another channel causes a variation in the magnetic flux of cores 7 and 8 in a way similar to that mentioned above. From such a novel principle, the movement of the armature produced by the movement of the stylus in both channels can produce signals reproducing satisfactorily stereophonic sound.

It is important for achieving the novel effect that a pole piece is opposed to another pole piece connected to the same yoke, and that an armature is positioned between the opposed pole pieces. Another important feature is that the magnetic flux from the pole pieces is concentrated in the armature. The concentration can be accomplished by employing an armature which makes the distance between an armature and a pole piece shorter than that between any two pole pieces having a different magnetic pole from each other.

Said magnet 15 can consist of any available and suitable magnet such as a permanent magnet or an induced magnet.

The yokes, cores and pole pieces can be made of conventional and suitable magnetic material having a high magnetic permeability such as permalloy and $\mu$-metal. The magnetic circuit element consisting of yoke, cores and pole pieces of the same magnetic pole can be of any form capable of having the two pole pieces opposed to each other.

It is necessary that the pair of pole pieces 20 and 21 of one magnetic circuit element be on a line which is perpendicular to the line formed by the pair of pole pieces 22 and 23 of the other magnetic circuit element. That is, a line connecting center points of bottom faces of the pair of pole pieces 20 and 21 is essentially perpendicular to the corresponding line of the other pair of pole pieces 22 and 23. The perpendicular combination of two pairs of pole pieces is necessary for use with dual channel stereo-recorded disks of 45°-45° type. When an armature 3 is positioned in the space surrounded by four lateral faces of said two pairs of pole pieces 20, 21, 22 and 23, a straight line connecting center points of the pair of pole pieces 20 and 21 is required to be perpendicular to the other pair of pole pieces 22 and 23. The combination of yoke, cores and pole pieces is attached to one end of the magnet in a manner designed to reduce the air gap between the yoke and the magnet as much as possible, and is fixed to the magnet by using conventional adhesive.

The armature 3 is made of any suitable ferromagnetic material having a high magnetic permeability such as $\mu$-metal.

The stylus shank is required to be made of a light non-magnetic material in order not to interfere with the magnetic field of the armature 3.

Figure 2:
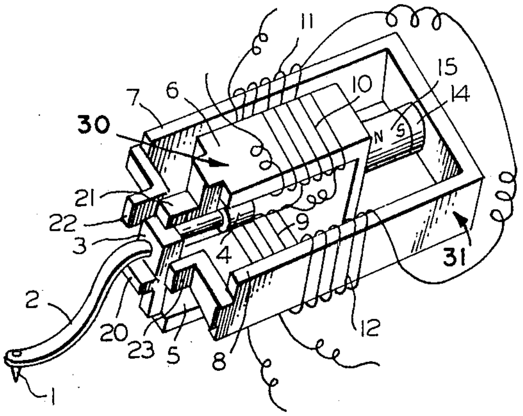
FIG. 2 is a perspective view of a magnetic stereophonic phonograph pickup forming an embodiment of the invention.

Referring to FIG. 2 wherein similar reference numbers have been utilized to indicate components similar to those in FIG. 1, a magnetic circuit element (see FIG. 2, circuit 30) consisting of a yoke 13 (not shown in FIG. 2), two cores 5 and 6 and two pole pieces 20 and 21 having a horse shoe shaped form is connected, through a magnet 15, with another horse shoe shaped magnetic circuit element (see circuit 31 in FIG. 2) consisting of a yoke 14, two cores 7 and 8 and two pole pieces 22 and 23. The pair of magnetic cores 5 and 6 and the pair of magnetic cores 7 and 8 are provided respectively with windings, in a manner similar to that described above. The pole pieces 20, 21, 22 and 23 are made so as to produce almost the same magnetic field with respect to a given point and are assembled in such a way that the pole pieces having like magnetic poles are opposed to each other and the line connecting the center points of pole pieces 20 and 21 is perpendicular to the corresponding line of the two pole pieces 22 and 23. Another important feature is that the four pole pieces 20, 21, 22 and 23 are symmetrical about a point.

An armature 3 is positioned in the space surrounded by the four pole pieces 20, 21, 22 and 23 in such a way that the center of the armature 3 is positioned at said point of symmetry with respect to the four pole pieces 20, 21, 22 and 23. The stylus 1 is connected to the center of the armature through a shank 2. The armature 3 is supported by a support 4 which is fixed at one end to a stand (not shown) and can move freely in the space surrounded by the four pole pieces in accordance with the movement of the stylus 1.

In this embodiment, the space for the armature is formed by employing the lateral faces of the four pole pieces. The armature 3 is square and of a size which makes the distance between the armature 3 and each of the pole pieces 20, 21, 22 and 23 shorter than that between any two adjacent pole pieces in order to prevent the leakage of magnetic flux from the armature.

Figure 3:
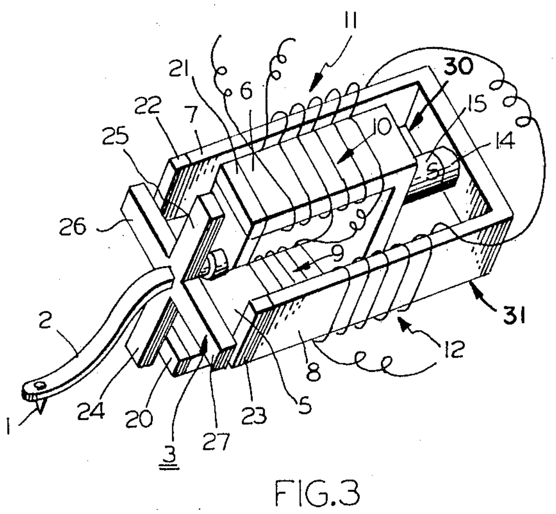
FIG. 3 is a perspective view of a magnetic stereophonic phonograph pickup forming another embodiment of the invention.

Another embodiment is shown in FIG. 3 wherein similar reference numbers are utilized to indicate components similar to those in the foregoing figures. Two horseshoe-shaped, magnetic circuits elements (see circuit elements 30 and 31 in FIG. 2) are combined through a magnet 15 in a manner similar to that of FIG. 2. Said circuit element 30 (see FIG. 1) consists of a yoke 13 (not shown in FIG. 3), two cores 5 and 6 and two pole pieces 20 and 21 and said circuit element 31 (see FIG. 1) consists of a yoke 14, two cores 7 and 8 and two pole pieces 22 and 23. Said cores 5, 6, 7 and 8 are provided with coils 9, 10, 11 and 12 respectively in a manner similar to that illustrated in FIG. 1. A cross-shaped armature 3 is positioned so that its four arms 24, 25, 26 and 27, face the end surfaces of the four pole pieces 20, 21, 22 and 23, respectively and is combined with the stylus 1 through the shank 2 which is fixed to the center point of the armature 3. Said armature 3 is supported by a support 4 (not shown in FIG. 3) which is located close to the center of said armature 3.

The vibrating motion of stylus 1 along the groove of a record disc can be composed of a movement parallel to a straight line connecting pole pieces 20 and 21 and of a movement parallel to a straight line connecting pole pieces 22 and 23. Since the support 4 is located close to the center of said armature 3, a vibration of stylus 1 parallel to the straight line connecting pole pieces 20 and 21 causes a rotational movement of said armature around the straight line connecting said arms 26 and 27. Consequently, one arm, for example, said arm 24 is close to said pole piece 20 and another arm 25 is relatively far from said pole piece 21. Such movements of said arms 24 and 25 increase the magnetic flux flowing through said core 5 from said magnet 15 and decrease the magnetic flux flowing through said core 6. The variation in the magnetic flux produces an induced voltage at coils 9 and 10 which are connected in series with each other. During such movements, there is no variation in the distance between said arm 26 and said pole piece 22 and between said arm 27 and said pole piece 23. As a result, there is no variation in the magnetic flux flowing through said cores 7 and 8.

The above will also occur with the rotation of said armature 3 around the straight line connecting arms 24 and 25. When said arm 26 is close to said pole piece 22 and said arm 27 is relatively far from said pole piece 23, a variation in the magnetic flux flowing through said cores 7 and 8 appears, producing an induced voltage at coils 11 and 12.

A combination of such actions reproduces an entirely satisfactory stereo phonographic sound.

Figure 5:
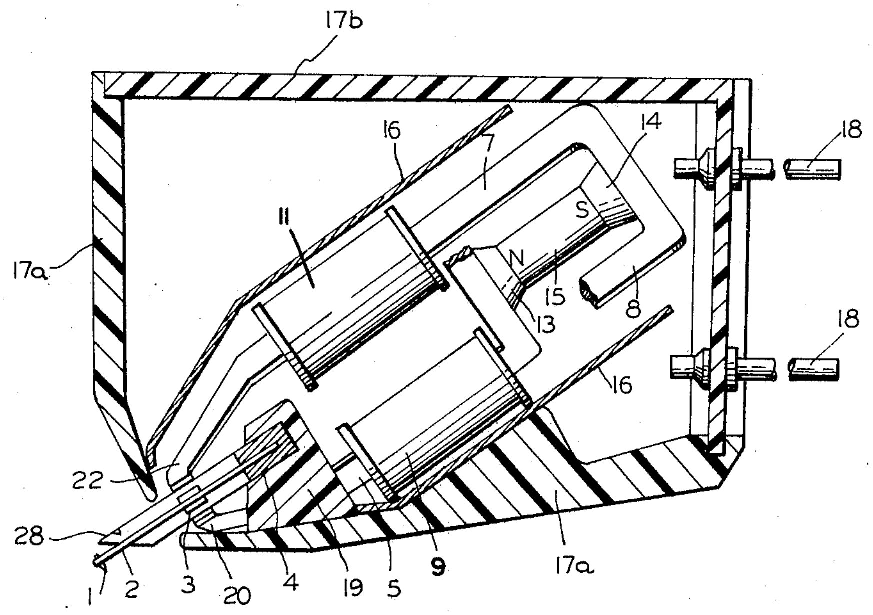
FIG. 5 is a cross-sectional view of the phonograph pickup of FIG. 2, which is mounted in a carriage.

A magnetic transducer according to the invention can be mounted in a cartridge in a conventional and suitable manner. Referring to FIG. 5 wherein similar reference characters designate components similar to those of the foregoing figures, reference character 50 designates, as a whole, a magnetic pickup. According to the invention, 19 is an adhesive material such as epoxy resin or phenol resin for fixing the support 4 of the armature 3 to a cartridge case 17*a* which is provided with a lining of a ferromagnetic plate. The lining provides magnetic shielding. Said ferromagnetic plate 16 is attached to said cartridge case 17*a* by, for example, a screw. The induced voltage at coils 9, 10, 11 and 12 (coils 10 and 12 not being shown in FIG. 5) is supplied to a lead wire of the pickup arm (not shown in FIG. 5) through terminals 18. Said cartridge case 17*a* is combined with a cartridge cover 17*b*. It may be fastened by employing, for example, a screw of said terminals 18.

Figure 4:
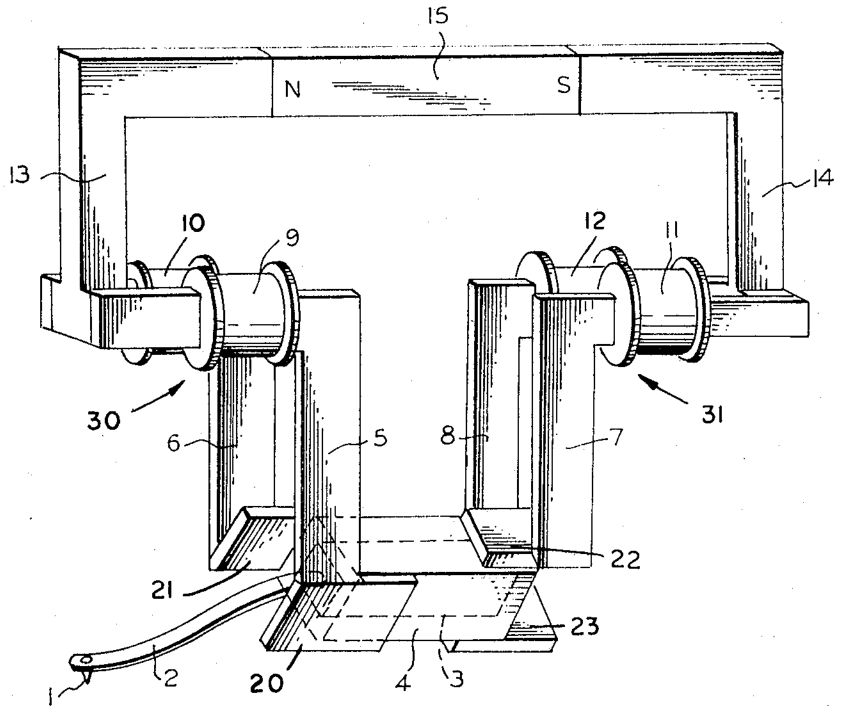
FIG. 4 is a perspective view of a magnetic stereophonic phonograph pickup forming another embodiment of the invention.

A further embodiment of the present invention is shown in FIG. 4 wherein similar reference characters are used to designate components similar to those of the foregoing figures. A pair of magnetic circuit elements such as 30 and 31 in FIG. 1 are in the shape of a letter L and, are connected by the magnet 15 similarly to those of FIG. 2. In connecting the pair of magnetic circuit elements, the arrangement is such that said magnetic circuit elements 30 and 31 (see FIG. 1) are opposed to each other so that lines between the two pairs of pole pieces of said pair of magnetic circuit elements are perpendicular. Said magnetic circuit element 31 (see FIG. 1) is positioned over the forward part of the armature 3 with the pole pieces 20 and 21 defining two opposed sides of a square and said magnetic circuit elements 30 (see FIG. 1) is positioned over the rear part of said armature with the pole pieces 22 and 23 defining the two remaining sides of a square. Said armature 3 is supported by an elastic body 4 such as rubber and produces a rotational movement with respect to the center thereof in accordance with the vibration of a stylus 1.

Said magnetic circuit element 30 (see FIG. 1) comprises the yoke 13, two cores 5 and 6 and two pole pieces 20 and 21 and said magnetic circuit element 31 (see FIG. 1) comprises the yoke 14, two cores 7 and 8 and two pole pieces 22 and 23. Said cores 5, 6, 7 and 8 are provided with coils 9, 10, 11 and 12 respectively in a way similar to that of FIG. 1. The ends of said pole pieces 20 and 21 are positioned rearward of the center of said armature 3 and the ends of said pole pieces 22 and 23 are positioned forward of said center of armature 3.

The vibrating motion of said stylus 1 along the groove of a record disc can be composed of a movement parallel to a straight line connecting pole pieces 20 and 21 and of a movement parallel to a straight line connecting pole pieces 22 and 23, and actuates said armature 3 to vibrate rotationally around the center of said armature 3 in a way similar to that illustrated with FIG. 3. For example, a movement of said stylus 1 along a straight line connecting pole pieces 20 and 21 causes a variation in the magnetic flux flowing through pole pieces 20 and 21 but no variation in the magnetic flux flowing through pole pieces 22 and 23. Said variation produces an induced voltage at said coils 9 and 10 which are connected in series so as to act as a single coil. Said coils 11 and 12 can also have an induced voltage produced therein when said stylus 1 moves in parallel to a straight line connecting said pole pieces 22 and 23.

A combination of such actions reproduces an entirely satisfactory stereo phonographic sound.

Figure 6:
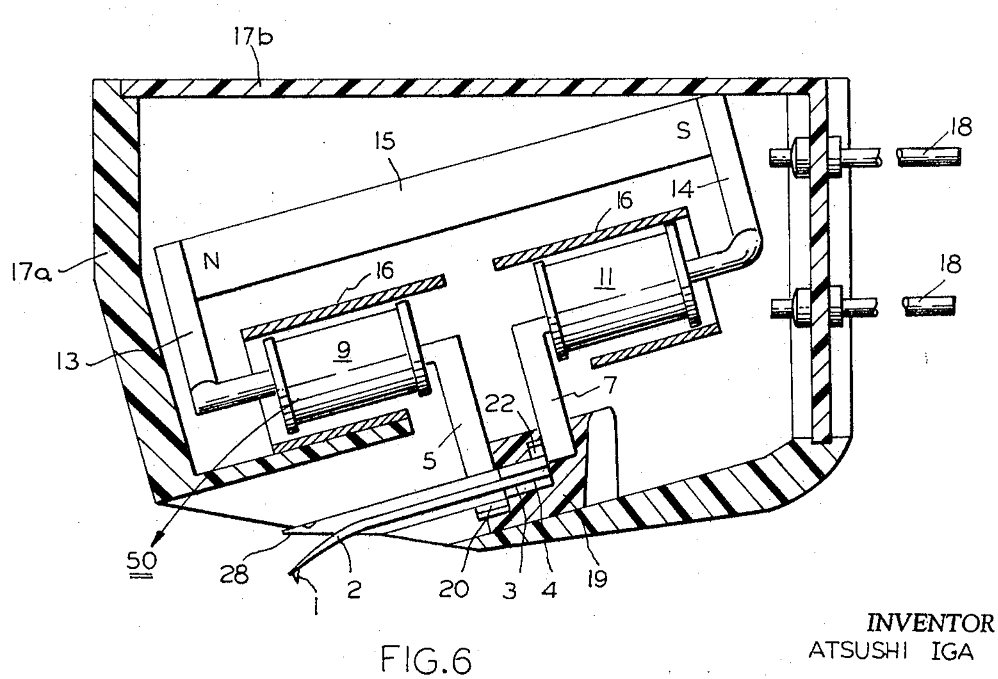
FIG. 6 is a cross-sectional view of the phonograph pickup of FIG. 4, which is mounted in a cartridge.

A pickup illustrated with reference to FIG. 4 is mounted in a cartridge as shown in FIG. 6. Similar reference characters designate components similar to those of FIG. 4 and FIG. 5.

Magnetic cores 5, 7, 6 and 8 (6 and 8 not being shown) are fixed to a support 19 which is connected to a cartridge case 17*a* and cover 17*b*. Said support is made of any suitable and available material such as organic resin and has a hollow for holding a frame 28 in which an armature 3 combined with a stylus 1, shank 2 and an elastic body 4 is inserted. Said frame 28 is easily substituted for another frame comprising a new stylus when the stylus does not work well.

What is claimed is:

1. A magnetic stereophonic phonograph pickup comprising a pair of magnetic circuit elements, each of said pair of magnetic circuit elements consisting of a pair of pole pieces opposed to each other, consisting of two cores each having one of the pole pieces therein, consisting of two coils, one on each core, and which are wound around the respective cores, and which are series-connected to each other so as to act as a single coil, and consisting of a yoke having one end connected to said cores; a magnet connected between said yokes, the pair of pole pieces of one of said pair of magnetic circuit elements being positioned relative to the pair of pole pieces of the other of said pair of magnetic elements such that lines between the center points of respective pole pieces are perpendicular to each other; an armature which is composed of a magnetic material positioned in the space having said perpendicular lines between the center points of respective pole pieces therein and movable freely therein; a shank of non-magnetic material on said armature; and a stylus on said shank.

2. A magnetic stereophonic phonograph pickup as claimed in claim 1, wherein said armature has a dimension such that the distance between said armature and a pole piece of a pair of magnetic circuit elements is shorter than the distance between adjacent pole pieces of said pairs of magnetic circuit elements.

3. A magnetic stereophonic phonograph pickup as claimed in claim 1, wherein said armature is cross shaped.

4. A magnetic stereophonic phonograph pickup as claimed in claim 1, said space with the perpendicular lines is defined by the opposed faces of said two pairs of pole pieces, lines between the opposed faces of the respective pairs of pole pieces being perpendicular to each other, the armature being given a movement by the action of the stylus following the groove of a recording which is composed of two linear movements in directions corresponding to said lines between said pole pieces.

5. A magnetic stereophonic phonograph pickup as claimed in claim 1, wherein said armature is cross shaped and faces the faces of said two pairs of pole pieces and moves rotationally about an axes extending substantially along the arms of said armature, whereby the difference in the distance between said armature and each of said two pairs of pole pieces causes a change in flux in said cores.

6. A magnetic stereophonic phonograph pickup as claimed in claim 1, wherein said shank is a non-magnetic light material selected from the group consisting of aluminum, magnesium berryllium and their alloys.

7. A magnetic stereophonic phonograph pickup as claimed in claim 1, wherein said armature is a soft magnetic material selected from the group consisting of permalloy and $\mu$-metal.

References Cited

UNITED STATES PATENTS

| | | | |
|---|---|---|---|
| 3,184,555 | 5/1965 | Marshall | 179—100.41 |
| 3,299,219 | 1/1967 | Madsen | 179—100.41 |

BERNARD KONICK, Primary Examiner

R. F. CARDILLO, Jr., Assistant Examiner